United States Patent [19]

Björk et al.

[11] 3,922,491

[45] Nov. 25, 1975

[54] TELECOMMUNICATION PLANT IN WHICH A WIDE-BAND CHANNEL IF WANTED IS CONNECTED BY THE SIDE OF A TELEPHONE CONNECTION

[75] Inventors: Harold John Carl Björk, Trangsund; Torben Erik Caroc, Bandhagen, both of Sweden

[73] Assignee: Telefonaktiebolaget LM Ericsson, Stockholm, Sweden

[22] Filed: Dec. 13, 1973

[21] Appl. No.: 424,459

Related U.S. Application Data

[63] Continuation of Ser. No. 250,978, May 8, 1972, abandoned.

[52] U.S. Cl. .......... 179/2 TV; 179/2 DP

[51] Int. Cl.² .......... H04M 11/00

[58] Field of Search .......... 179/2 TV, 3, 4, 2 DP

[56] References Cited

UNITED STATES PATENTS

| | | | |
|---|---|---|---|
| 3,711,648 | 1/1973 | Whitney | 179/2 TV |
| 3,766,324 | 10/1973 | Budrys et al. | 179/18 E |
| 3,819,868 | 6/1974 | Ozeki et al. | 179/18 C |

*Primary Examiner*—Kathleen H. Claffy
*Assistant Examiner*—C. T. Bartz
*Attorney, Agent, or Firm*—Hane, Baxley & Spiecens

[57] ABSTRACT

In a telecommunication system, a wide-band channel when desired is connected next to a telephone connection by a system which comprises a first line system intended for telephone traffic and a second line system with wide-band communication channels intended for data transmission, picture transmission, etc. At least some subscribers have a special apparatus for wide-band connections and an apparatus attachment by the side of a subscriber's telephone. The high operating costs for a wide-band connection requires that the connection not be established before it is actually to be used and that it be released after use without the telephone connection being disconnected and restored. Thus, a picture transmission can be connected and disconnected several times during a telephone call but it is inconvenient to send a subscriber's telephone number each time, and no changes in the telephone exchange can be accepted. According to the invention each of such subscribers has at least one change-over switch in his apparatus attachment under control of the subscriber. When a wide-band connection is required between the two parties in an arranged telephone connection, each of the parties operates his change-over switch which causes a call to a control center and the setting of a signal connection. There is also initiated a signal interchange between the subscriber's equipments via the arranged telephone connection utilized by the control center for connecting the special apparatus of the subscribers via a wide-band connection.

6 Claims, 4 Drawing Figures

TELECOMMUNICATION PLANT IN WHICH A WIDE-BAND CHANNEL IF WANTED IS CONNECTED BY THE SIDE OF A TELEPHONE CONNECTION

This is a continuation of application Ser. No. 250,978, filed May 8, 1972, and now abandoned.

The present invention relates to a telecommunication plant comprising on the one hand a first line system intended for telephone traffic via at least one telephone exchange by using subscriber's telephones which have associated subscriber's lines, and on the other hand a second line system with wide-band communication channels intended for teletraffic other than calls, e.g. data transmission, picture transmission, and for such special apparatus, between which wide-band connections are connected by means of at least one switching center intended for such second line system. A number of subscribers are assumed to be equipped with a subscriber's telephone having a subscriber's line for calls in the first line system as well as with one of such special apparatus having an associated second line connected to the switching centre.

It is known to establish a picture communication connection parallel to a call connection by the calling subscriber at the time of establishment of the telephone connection by prefixing the call number. A register in the telephone system then controls the connection route, so that a wide-band communication connection is obtained via special intended lines simultaneously with a call connection.

It is even known in a wide-band communication system to arrange a low frequency channel for the call and the setting up signals and to use the rest of the wide-band for picture transmission. The drawback with the known solutions is, however, that picture transmission as well as call connection are established simultaneously even if picture transmission not is required. Hence, unnecessary costs arise. The high costs for a wide-band connection dictates that it not be established before it is needed and that it will be disconnected when no longer needed without the telephone connection being disconnected and restored. It is assumed in this connection that a special fee is required for the wide-band connection, in addition to the call fee for the telephone connection and that the party in the call connection which desires the wide-band connection, is debited for it. It is also desirable to be able to change transmission direction, so that any of the parties can be sending or receiving party during the call.

These objects are satisfied according to the invention by means of an apparatus attachment, to which the subscriber's telephone of a subscriber as well as the special apparatus of the subscriber are connected and from which the telephone line of the subscriber's apparatus comes as well as a line belonging to said second line system, and of at least one change-over switch in the apparatus attachment which change-over switch is influenced of the subscriber, when a wide-band connection is required between the parties in an arranged telephone connection. Thus each of the parties can call to the switching center and cause the establishment of a signal connection between its subscriber's line and its second line and a signal interchange by means of call activated devices in the switching centre via the arranged telephone connection, whereupon the switching centre by means of the signal interchange connects the special apparatus of the subscribers via a wide-band connection.

The invention will be described more in detail below with reference to accompanying drawings of which FIGS. 1–2 show a first embodiment of the invention and FIGS. 3–4 show a second embodiment. The choice of embodiments to use depends on the line costs and the picture quality.

Figure 1:
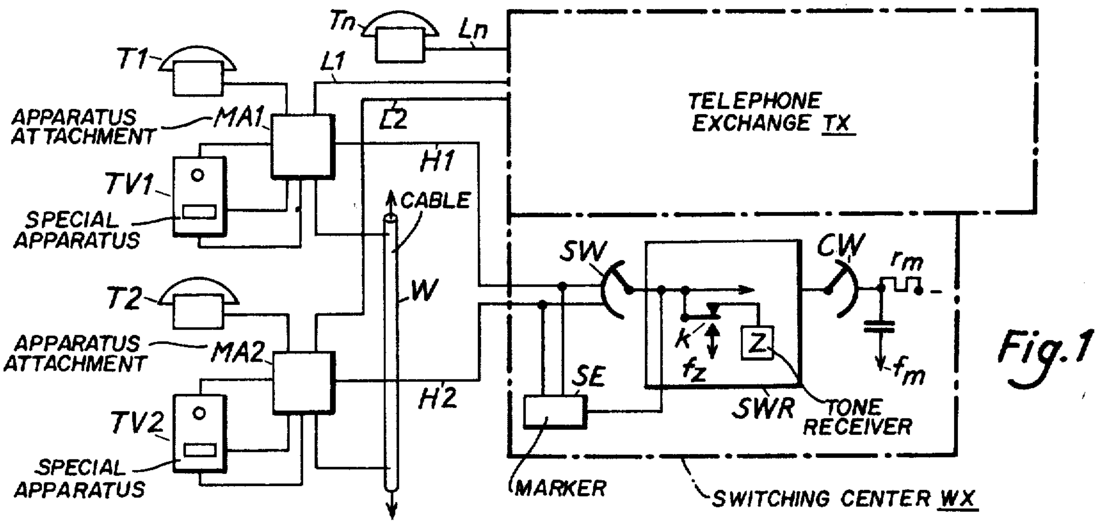
FIG. 1 shows a block diagram for a telecommunication plant where there is besides a normal telephone system a second line system comprising on the one hand for a plurality of subscribers one common coaxial line with a number of wide-band channels, and on the other individual signal lines between the subscribers and a switching centre for connection via such channels.

In FIG. 1 there is an ordinary telephone exchange TX to which subscriber telephones T1, T2, Tn are connected by means of subscriber lines L1 and L2, Ln respectively. Call connections between these lines are connected in a known manner. Some subscribers such as those with apparatus T1 and T2 are also equipped with special apparatus TV1 and TV2, respectively, for picture transmission and also with an apparatus attachment MA1 and MA2, respectively. Jointly for these subscribers there is a switching center WX and a line for wide frequency band, e.g., coaxial cable W, intended for picture transmission. All apparatus attachments MA1 and MA2 are fixed connected to the coaxial cable W and have furthermore an individual signal line H1 and H2 respectively connected to the switching centre WX. The lines H1 and H2 can be usual telephone lines.

The switching centre WX works according to principles known from standard telephone exchange techniques. A calling marker SE receives all calls from the lines H1, H2, one by one, identifies the calling line and connects it to a device e.g. a relay set SWR in the exchange by means of a selector arrangement SW. In the relay set SWR a tone receiver Z is included which is connected via a contact arrangement k to the calling line e.g. H1 during a short time interval and which is influenced if a tone with certain given frequency $f_z$ is on the line during the time interval. If the tone receiver Z is not influenced, it is disconnected from the contact arrangement k after said interval and the tone with the frequency $f_z$ is connected to the calling line. If the tone with the frequency $f_z$ is on the calling line, receiver Z is influenced and a selector CW belonging to set SWR is started and choses a free wide-band channel e.g. by testing a number of resistors $r_m$, one for each channel. After the test, if a free channel is found, the channel characterizing tone signal $f_m$ is connected to the calling line during a short time interval. The lines H1 and H2 are presumed to be normal telephone lines such as those from the automatic telephone system to known subscriber's line equipment.

Figure 2:
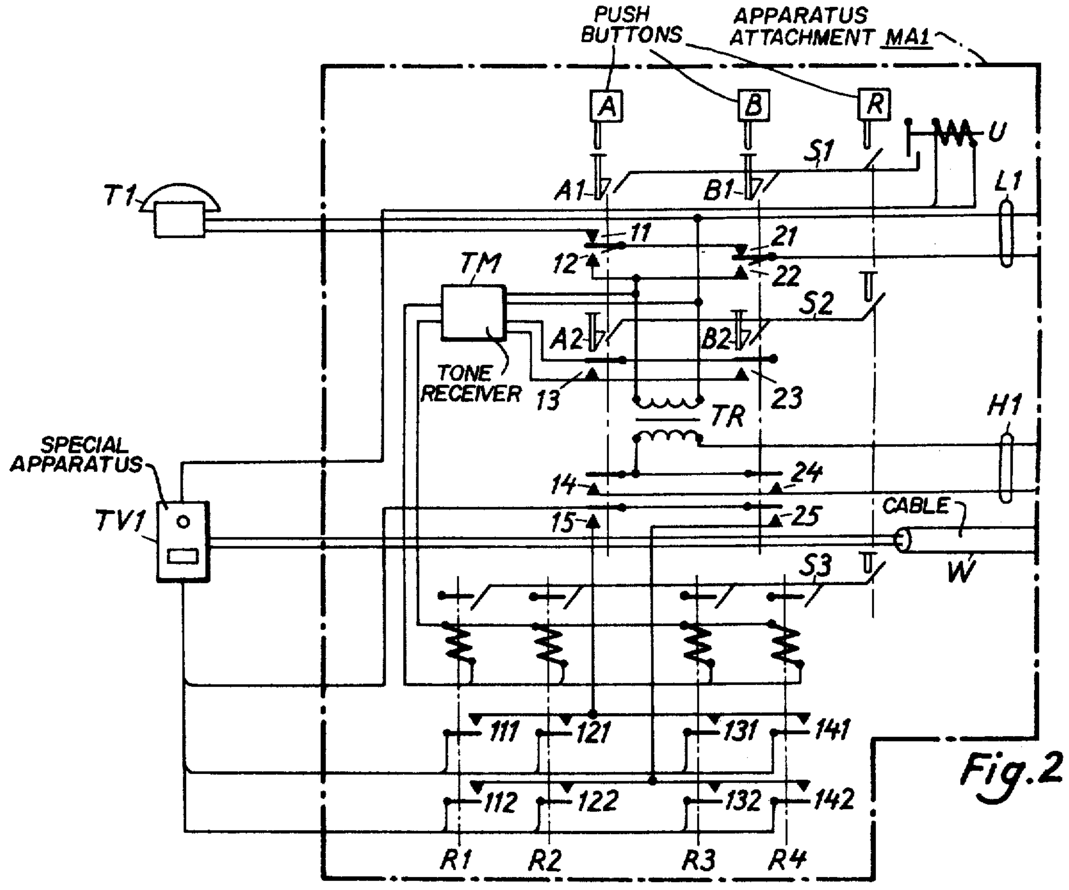
FIG. 2 shows an equipment of a subscriber for calls and picture transmission in a plant according to FIG. 1.

In FIG. 2 T1 is a normal subscriber's apparatus, TV1 a combined sender and receiver for picture transmission and MA1 an apparatus attachment. Associated with attachment MA1 are two push buttons, button A for sending and button B for receiving of a picture. To the push buttons contact springs 11-15 and 21-25, respectively, belong as well as mechanical lock arrangements A1, A2 and B1, B2 respectively. For lock arrangements A1, B1 there is a release magnet U and a lock rail S1. For the lock arrangements A2, B2 there is a lock rail S2. Furthermore there is a re-setting button R, a tone receiver TM, a transformer Tr and four relays R1-R4 with contacts 111-112, 121-122, 131-132 and 141-142, respectively. The relays R1-R4 have arrangements for mechanical locking in a closed position and have a joint lock rail S3. By means of the re-setting button R all lock rails S1, S2, S3 are influenced for the resetting of all influenced contacts to the position showed in FIG. 2. The subscriber's telephone T1 is connected to the subscriber's line L1 via the contacts 11 and 21. The signal line H1 can be connected to the one winding of the transformer TR by means of the contacts 14 and 24 respectively. A wide-band coaxial cable W is connected directly to sender receiver TV1. The subscriber's line L1 can, by means of the contacts 12 and 22 respectively, be connected to the second winding of the transformer TR. Each of the relays R1-R4 correspond to one wide-band channel on the line W and form a channel selector which is controlled by means of the tone receiver TM from the switching centre WX.

Here it is assumed that a telephone connection is connected between the subscriber's telephones T1 and T2 through the telephone exchange TX. Who has established the connection is of no importance. After a time of conversation the subscriber at telephone T1 wishes to display a picture for the subscriber at T2 and therefore presses down the button A. The contact 11 interrupts the telephone connection and the contacts 12-15 close. The line loop for line H1 is closed by the lower winding on the transformer TR and the contact 14. The tone receiver TM is prepared for tone reception of a current circuit by the contact 13.

In the switching centre WX in FIG. 1 the line H1 is connected to a relay set SWR by a selector SW. The tone receiver Z in the relay set SWR is not influenced, and for that reason the contact arrangement $k$ is operated after a short time interval and tone with the frequency $f_z$ is connected to line H1. This tone is catched fed via the transformer TR, the line L1 and exchange TX to the subscriber at the subscriber's telephone T2 who responds by pressing down his push button B in the apparatus attachment MA2. The contacts 21-25 are influenced. The line loop for the line H2 is closed by the lower winding of transformer TR and the contact 24 in his attachment MA2, so that call is marked on the line H2 in the switching centre WX. The line H2 is connected by the calling marker SE to a free relay set SWR by a selector SW.

The tone receiver Z in this relay set SWR is influenced by the tone $f_z$ to start that the selector CW which finds a free wide-band channel i.e. a free resistor $r_m$. When selector CW has engaged and stopped on a free resistance $r_m$, a tone corresponding to the channel is sent with the frequency $f_m$ via units CW, SWR, SW and the line H2 to the apparatus attachment MA2, whereby the tone receiver TM is influenced. Simultaneously the tone $f_m$ passes through the line L2 and the call connection in the telephone exchange TX to the line L1 and the apparatus attachment MA1 and influences its tone receiver TM. Here it is assumed that the tone receivers TM in MA1 as well as in MA2, when they are influenced of a tone with the frequency $f_m$, cause operation e.g. of the relay R1 in both the apparatus attachments. The armature of the relay is locked of the rail S3 and the contacts 111-112 are influenced. Simultaneously or with some delay the magnet U is locked in attachment MA1 as well as in MA2 e.g. by means of a thermo-contact in transmitter/receivers TV1 and TV2 respectively. The lock rail S1 is influenced so that the lock arrangements A1, B1 are detached and the contacts 11, 12 and 21, 22 respectively are re-set. In this way the call connection is re-set between the subscriber's telephones T1 and T2. The apparatus for picture transmission TV1 and TV2 are activated by the following current circuits. In attachment MA1 a current circuit is closed through the contacts 15 and 111 whereby apparatus TV1 is started for sending a picture on the channel corresponding to the relay R1 on the line W. In attachment MA2 a current circuit is closed through the contacts 25 and 112 whereby apparatus TV2 is arranged for reception of a picture on the channel corresponding to relay R1.

The picture transmission remains until one of the subscribers presses down the releasing button R so that the relay R1 and the lock arrangements A2, B2 are made free.

During the picture transmission sending and reception can, if so desired, be changed-over when the subscriber at T1 presses his B-button, whereby the lock A2 of the A-button is made free, and the subscriber at T2 presses his A-button, whereby the lock B2 is made free. The thermo-contacts in the apparatuses TV1 and TV2 respectively are heated, and for that reason the magnet U is influenced and the call connection is kept.

All subscribers connected to center WX have a meter for debiting fees for picture transmission. This meter is arranged for each line H1 and H2, respectively, in agreement with what is usual for call metering in automatic telephone exchanges. In principle the subscriber who first calls i.e. presses down some of the push buttons A is debited. In the relay set SWR which first is engaged at a picture transmission, the contact arrangement $k$ becomes influenced so that the debiting is started, either immediately or after a tone $f_m$ which shows that a channel is chosen, appears. In the last mentioned case there therefore must be a tone receiver in the relay set SWR which implies that the tone $f_m$ can be registered e.g. by setting of the selector CW in the first engaged relay set SWR and the later engaged relay set can be made free, so that only one relay set SWR is occupied during each picture transmission connection.

Figure 3:
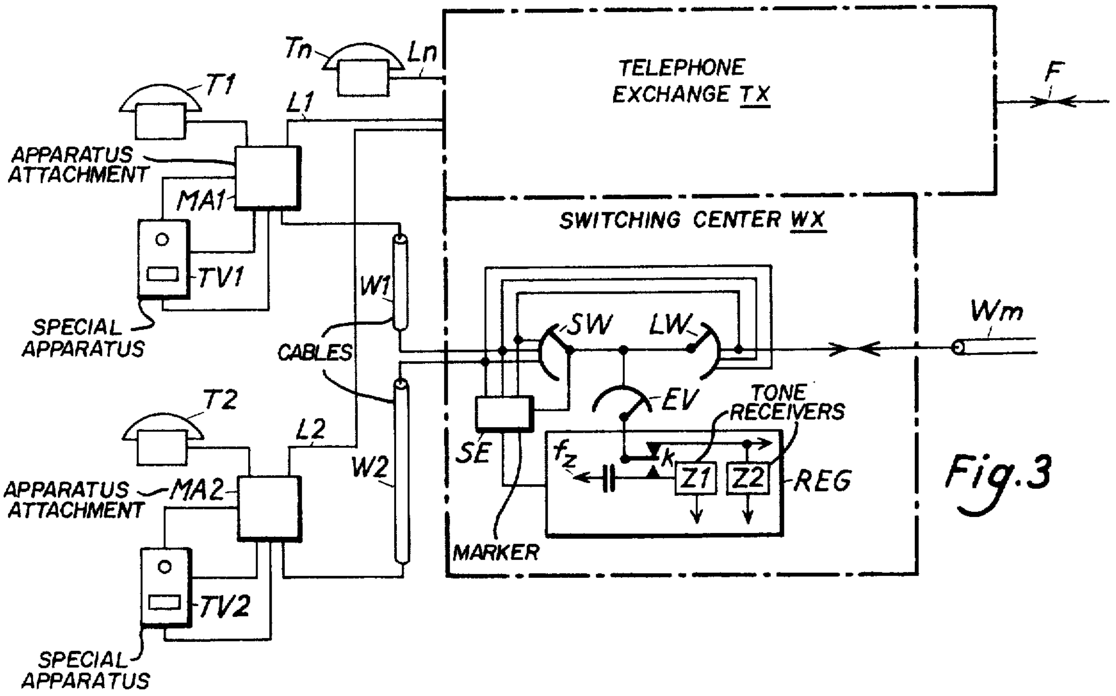
FIG. 3 shows a telecommunication plant consisting of a normal telephone system with normal subscriber apparatus combined with a special line system for picture transmission. Each subscriber which has an apparatus for picture transmission, has his own coaxial line to a switching centre in said system.
Figure 4:
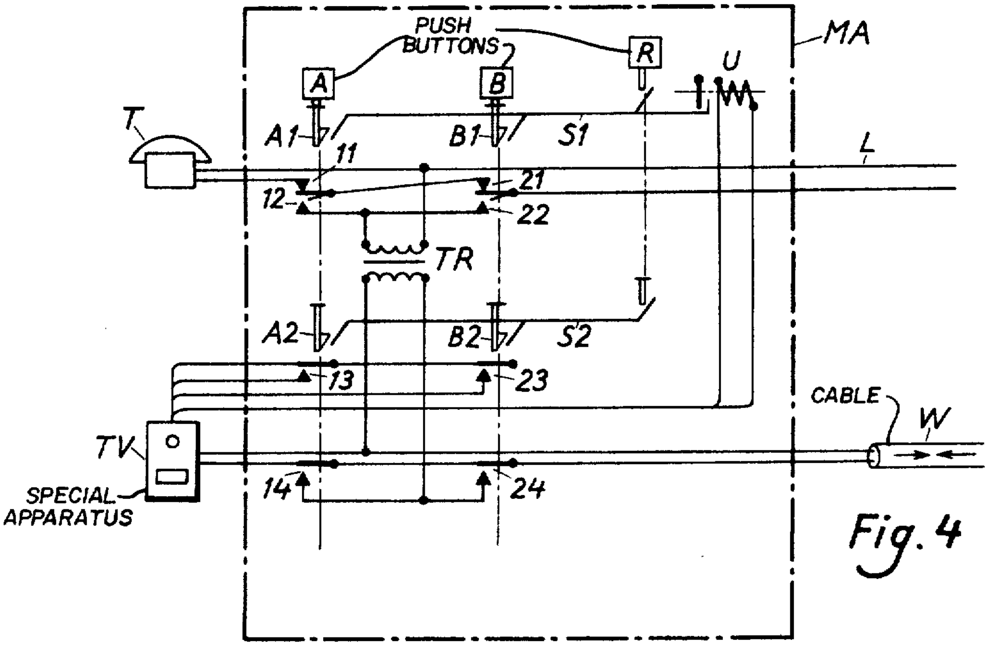
FIG. 4 shows the equipment of a subscriber in a plant according to FIG. 3.

FIGS. 3–4 show a telecommunication plant with picture transmission, where certain of the subscribers T1-Tn on the one hand have a usual subscriber's line L1, L2 in a telephone system L1-Ln with at least one telephone exchange TX, and on the other hand a line W1, W2 for wide-band channels in a special line system with at least one switching centre WX. From the telephone exchange TX connection lines F go to other telephone exchanges. Parallel to the lines F for calls there is a smaller number of lines Wm for wide-band channels arranged between the switching centre WX and other exchanges for picture transmission.

The centre WX in FIG. 3 comprises a calling marker SE which sends sequentially calls from the lines W1, W2 and Wm, a number of registers REG and a number of connecting circuits between one line finder SW and a line selector LW. The connecting circuits SW - LW are connected by means of selector EV to the registers REG. The registers include tone receivers Z1, Z2 and arrangements for sending tone signals.

At the subscribers there are arrangements which are shown in FIG. 4 and comprise a normal subscriber's telephone T for calls, a combined sender and receiver TV for picture transmission and an apparatus attachment MA. The apparatus attachment MA includes two push buttons A and B of which A is used for sending and B for reception of a picture. The button A influences the contacts 11 - 14 and B influences the contacts 21 - 24.

For the contacts 11 - 12 there is a mechanical lock arrangement A1, and for the contacts 13 - 14 a mechanical lock arrangement A2. There are similar lock arrangements B1 and B2 respectively for the contacts 21 - 22 and 23 - 24 respectively. Jointly for arrangements A1 and B1 there is a lock rail S1 with a solution magnet U. Jointly for A2 and B2 there is a lock rail S2. By means of a release button R, both the lock rails S1 and S2 can be operated so that all contacts which have been influenced, are released. In the figure a transformer TR is also shown, a usual subscriber's line L for calls and a special line W for picture transmission on a channel with given frequency band.

A call connection will be assumed to be established between the subscriber's telephones T1 and T2 in FIG. 3. The subscriber's lines L1 and W1 and L2 and W2, respectively, need not as in the figure be connected to the same exchange TX and WX respectively, but can belong to different exchanges in a long line system. The number of lines L1-Ln and F are presumed large compared with the number of lines W1, W2, Wm.

Assume that during the call a picture transmission is desired. The one who shall pay the picture transmission presses one of his buttons A or B, wherein A stands for sending and B for reception. Here is assumed that the subscriber at T1 presses A-button. The contacts 11 - 14 are influenced. The speech connection is interrupted by the contact 11 but the line circuit through L1 is kept closed by the contact 12 and the upper winding of the transformer TR. A call to the exchange WX is marked for the line W1 by closing the line circuit through W1, the lower winding of the transformer TR and the contact 14. According to known techniques valid for automatic telephone exchanges the call is identified in exchange WX by the calling marker SE which choses a free register REG and transfers data, e.g. the subscriber's number, for the line W1 to register REG for registration. Simultaneously a free connecting circuit SW-LW is chosen, the selector SW in this connecting circuit is set on the line W1 and the selector EV connects REG with circuit SW-LW. Then the connection which occurs very rapidly is tested during a short time moment by means of the tone receiver Z2 to determine if tone with certain given frequency $f_z$ is on the line W1. When this is not the case the contact arrangement $k$ is influenced so that receiver Z2 is disconnected and a tone with the frequency $f_z$ is connected via units EV and SW to the line W1.

The tone $f_z$ passes through the transformer TR and the contact 12 in the apparatus attachment MA1 to the line L1 and via the speech connection in exchange TX to the line L2 and the apparatus T2. When the subscriber at the apparatus T2 hears the tone he presses his push button B. The contacts 21 - 24 are operated and are kept in place by the lock arrangements B1 and B2 respectively. The subscriber's telephone T2 is disconnected, but the line circuit for line L2 is kept closed by the contact 22 and the upper winding of the transformer TR. The contact 23 connects the receiver in the apparatus TV2. The line circuit for the line W2 is closed for direct current by the contact 24 and the lower winding on the transformer TR. The call is marked in the switching centre WX and the calling marker SE connects the line W2 to a free register REG via the selector SW and EV as was described above. Since tone with the frequency $f_z$ is now on the line W2, the tone receiver Z2 is influenced in the last mentioned REG. The contact arrangement $k$ is not influenced, but from the automatic telephone exchanges known, arrangements in register REG are influenced and send tone signals which carry data held in register REG, identifying the line W2, e.g., the subscriber's number for the apparatus T2 or a special number valid for the line W2 in the system for wide-band connections. These data signals are received from the tone receiver Z1 in the register REG connected to the line W1 according to the above and are registered.

Thereafter, the register connected to line W2 can be made free. Even the connecting circuit SW-LW can be made free, if the lines W1-W2 are equipped with arrangements for line blocking, so that a call cannot be repeated until the line loop is broken and once again is closed.

When register REG connected to line W1 has registered data for the line W2 a connection is arranged between the lines W1 and W2 via the selector LW, and possibly via a connection line Wm if the lines W1 and W2 are connected to different exchanges in the wide-band system. After this even the first engaged register connected to line W1 is made free, but corresponding connecting line circuit SW-LW is held.

In the apparatus TV there are arrangements e.g. a thermocontact which is influenced when the apparatus is ready for sending or reception and which gives at least one pulse to the magnet U, so that the lock rail S1 is drawn away and the contacts 11, 12 and 21, 22 respectively are released. The call connection between the subscriber's telephones T1 and T2 is restored and the picture transmission connection between TV1 and TV2 remains until the release buttons R are pressed down. Shifting of transmission direction can occur by changing of the buttons A and B. Debiting for picture transmission is attended to by the connecting line SW-LW e.g. in a meter belonging to the line W1.

The invention is not limited to the embodiments shown in FIGS. 1–4. In the cases when the apparatus attachment MA as in FIG. 2 is equipped with a tone receiver TM only a change-over switch A or B is required, if the signals are utilized so that the one which first influences its change-over switch, is connected for sending and the other for reception of a picture. If a special debiting is required for picture transmission, a special push-button can be arranged in the apparatus attachment for sending a special signal to the switching centre WX concerning debiting e.g. a rectifier is connected into the call current circuit and the register tests both current directions in the line loop.

We claim:

1. An automatic telephone plant for connecting a calling subscriber to a called subscriber comprising:

a first line system for voice telephone traffic having a first subscriber line, a second subscriber line and a telephone exchange actively connecting said first subscriber line to said second subscriber line;

a second line system for wideband telesignal traffic having a first control signal line, a second control signal line, a cable having at least one wideband communications channel, and a switching center connected to said first and second control signal lines;

a first subscriber station comprising:

a first subscriber telephone, a first wideband communications apparatus, and a first apparatus attachment, said first apparatus attachment comprising first connecting means for connecting said first subscriber line to said first subscriber telephone, a first control means having a control signal input responsive to a wideband connection control signal for connecting said wideband communications channel to said first wideband communications apparatus, and a first switch means including means when operated for connecting said first subscriber line to the control signal input of said first control means and to said first control signal line;

a second subscriber station comprising:

a second subscriber telephone, a second wideband communications apparatus, and a second apparatus attachment, said second apparatus attachment comprising second connecting means for connecting said second subscriber line to said second subscriber telephone, a second control means having a control signal input responsive to said wideband connection control signal for connecting said wideband communications channel to said second wideband communications apparatus and a second switch means including means when operated for connecting said second subscriber line to the control signal input of said second control means and to said second control signal line;

said switching center including means responsive through said first control signal line to the operation of said first switch means for generating a tone signal for transmission via said first control signal line, said first switch means, said first subscriber line, said telephone exchange, said second subscriber line and said second connecting means to said second subscriber telephone, and including means responsive through said second control signal line to the operation of said second switch means after the operation of said first switch means for generating said wideband connection control signal for transmission via said second control signal line to said second switch means and the control signal input of said second control means, and also from said second switch means via said second subscriber line, said telephone exchange, said first subscriber line, said first switch means to the control signal input of said first control means whereby said first and second wideband communications apparatuses are connected to the one wideband communications channel of said cable.

2. The automatic telephone plant of claim 1 wherein said first connecting means is coupled to said first switch means and includes means operative when said first switch means is operated for disconnecting said first subscriber telephone from said first subscriber line and also includes means for reconnecting said first subscriber telephone to said first subscriber line after said first wideband communications apparatus is connected to said one wideband communication channel of said cable.

3. The automatic telephone plant of claim 1 further comprising means for charging to said first subscriber station the tolls for the connection of said first wideband communications apparatus via said one wideband communications channel to said second wideband communications apparatus.

4. An automatic telephone plant for connecting a calling subscriber to a called subscriber comprising:

a first line system for voice telephone traffic having a first subscriber line, a second subscriber line and a telephone exchange actively connecting said first subscriber line to said second subscriber line;

a second line system for wideband telesignal traffic having a first cable, a second cable, each of said cables having a wideband communications channel and means for transmitting control signals, and a switching center connected to said first and second cables;

a first subscriber station comprising:

a first subscriber telephone, a first wideband communications apparatus, and a first apparatus attachment, said first apparatus attachment comprising first connecting means for connecting said first subscriber line to said first subscriber telephone, second connecting means for connecting said first cable to said first wideband communications apparatus, and a first switch means including means when operated for activating said first wideband communications apparatus and including means for connecting said first subscriber line to said first cable;

a second subscriber station comprising:

a second subscriber telephone, a second wideband communications apparatus, and a second apparatus attachment, said second apparatus attachment comprising third connecting means for connecting said second subscriber line to said second subscriber telephone, fourth connecting means for connecting said second cable to said second wideband communications apparatus, and a second switch means including means when operated for activating said second wideband communications apparatus and including means for connecting said second subscriber line to said second cable; and said switching center including first means responsive through said first cable to the operation of said first switch means for registering such fact and for generating a tone signal for transmission via said first cable, said first switch means, said first subscriber line, said telephone exchange, said second subscriber line and said third connecting means to said second subscriber telephone, including second means responsive through said second cable to the operation of said second switch means for registering such fact, and including third means responsive to the tone signal transferred from said second subscriber line to said second cable upon the operation of said second switch means occurring after the operation of said first switch means for actively connecting said first cable to said second cable.

5. The automatic telephone plant of claim 4 wherein said first connecting means is coupled to said first switch means and includes means operative when said first switch means is operated for disconnecting said first subscriber telephone from said first subscriber line and also includes means for reconnecting said first subscriber telephone to said first subscriber line after said wideband communications apparatuses are connected to each other via said cables and said switching center.

6. The automatic telephone plant of claim 4 further comprising means for charging to said first subscriber station the tolls for the connection of said first wideband communications apparatus via said first and second cables and said switching center to said second wideband communications apparatus.

* * * * *